(12) United States Patent
Kuhn

(10) Patent No.: US 6,779,767 B2
(45) Date of Patent: Aug. 24, 2004

(54) EXTENSION ARM

(75) Inventor: Peter Kuhn, Munich (DE)

(73) Assignee: Mavig GmbH, Munich (DE)

( * ) Notice: Subject to any disclaimer, the term of this patent is extended or adjusted under 35 U.S.C. 154(b) by 23 days.

(21) Appl. No.: 10/296,408

(22) PCT Filed: Mar. 13, 2001

(86) PCT No.: PCT/EP01/02811
§ 371 (c)(1),
(2), (4) Date: Nov. 25, 2002

(87) PCT Pub. No.: WO01/90631
PCT Pub. Date: Nov. 29, 2001

(65) Prior Publication Data
US 2003/0173482 A1 Sep. 18, 2003

(30) Foreign Application Priority Data
May 25, 2000 (DE) .......................... 100 25 839

(51) Int. Cl.⁷ ................................................ E04G 3/00
(52) U.S. Cl. ........................... 248/276.1; 248/289.11; 403/104
(58) Field of Search ................. 248/276.1, 288.11, 248/289.11, 291.1, 292.13, 404, 405, 407, 410, 411, 413, 317, 323, 324, 326, 327, 333; 403/107, 109.3, 104, 327, 375

(56) References Cited

U.S. PATENT DOCUMENTS

| | | | |
|---|---|---|---|
| 2,954,251 A | * | 9/1960 | Reuter et al. .................. 403/37 |
| 3,168,341 A | | 2/1965 | Beaudet |
| 3,306,639 A | | 2/1967 | Lyon |
| 3,604,734 A | * | 9/1971 | Friedman et al. ............ 403/104 |
| 4,548,373 A | * | 10/1985 | Komura .................... 248/122.1 |
| 4,673,154 A | * | 6/1987 | Karapita ..................... 248/320 |
| 4,687,167 A | * | 8/1987 | Skalka et al. ................ 248/126 |
| 5,039,043 A | * | 8/1991 | Hodge ....................... 248/125.8 |
| 5,909,864 A | * | 6/1999 | Wang ..................... 248/289.11 |
| 6,095,468 A | * | 8/2000 | Chirico et al. ............ 248/282.1 |

FOREIGN PATENT DOCUMENTS

| | | |
|---|---|---|
| DE | 84 36 146 U | 5/1986 |
| DE | 43 21 726 A1 | 1/1999 |
| DE | 198 03 570 C1 | 3/1999 |
| EP | 0 930 055 A | 7/1999 |

* cited by examiner

Primary Examiner—Anita M. King
(74) Attorney, Agent, or Firm—Scully, Scott, Murphy & Presser

(57) ABSTRACT

An extension arm (1) is provided, especially a pivotal and adjustable-tilt extension arm for a supporting system, for the suspended fixing of preferably medial devices (2–5) through a joining element (6–9) fastened to a fixing piece (17) of the extension arm (1). The extension arm includes a securing element (34), which is guided through an opening (35) of the fixing piece (17) and secures the fastening of the joining element (6–9) to the fixing piece (17) by engaging inside a groove (36) of the joining element (6–9). The extension arm also includes a securing bush (26), which at least partially surrounds the fixing piece (17) and the joining element (6–9) and which secures the securing element (34) through the use of a spring element (40).

15 Claims, 3 Drawing Sheets

EXTENSION ARM

BACKGROUND OF THE INVENTION

1. Field of the Invention

The invention relates to an extension arm, particularly a pivotable and inclinable extension arm, for a supporting system, for the suspended attachment of preferably medical devices.

2. Discussion of the Prior Art

A known extension arm comprises a horizontal or spring arm, which is attached by means of a connecting piece of the extension arm to a ceiling mount which is preferably mounted on the ceiling of a room in which the devices are used. Here, the connecting piece is connected to the horizontal arm by way of a hinge joint, so that the horizontal arm can be inclined relative to the connecting piece with respect to the horizontal. Moreover, the extension arm has an attachment piece which is connected by means of a joint piece to the horizontal arm and on which for example medical equipment, such as an operating light or a protective X-ray shield may be attached. In order to enable a plurality of different devices to be attached to the extension arm, the connection is designed to be releasable, which means that it is necessary to secure the connection in order to prevent the connection from being released unintentionally. The known securing means has a securing element which engages in a groove in the connecting element connected to the device, thus blocking withdrawal of the connecting element from the attachment piece. Here, the connection is designed in such a way that part of the weight of the device acts on the securing element in the assembled condition.

The known extension arm has a plurality of disadvantages. In the course of time, the securing element can escape from the groove with the result that it now engages only partially in the groove and the securing force is considerably reduced in the event of maloperation. If the securing element engages only partially in the groove, the problem moreover arises that—if the device to be attached is very heavy—the load from only part of the weight of the device is sufficient to bend the securing element or damage the connecting element in the region of the groove as a result of the load on the securing element in the region of the groove in the connecting element. During dismantling, e.g. dismantling for the purpose of attaching another medical device, this can also result in it no longer being possible to remove the securing element from the groove in the connecting element—or it only being possible to remove it with difficulty—with the result that substantial repair measures are required. There is moreover a risk of the securing element not engaging evenly in the groove in the connecting element, with the result that the securing force is relatively small and the problems discussed above arise accordingly.

SUMMARY OF THE INVENTION

The object of the invention, therefore, is to provide an extension arm in which the functionability of the securing mechanism is ensured and, in particular, the cooperation between the securing element and the connecting element is improved, and furthermore to devise a process by means of which this secure connection can be produced.

The object is achieved by an extension arm in which a spring element is pushed at least partially between a securing bushing and the securing element. Furthermore, there is also provided a method for assembling a preferably medical device by use of the connecting element on an extension arm.

The extension arm according to the invention is advantageous in that the securing element for securing the attachment of the connecting element on the attachment piece is held in the groove of the connecting element by the spring element, thus achieving a reliable securing action whereby the securing element is prevented from escaping from the groove in the connecting element and an uneven load on the securing element in the region of the groove is avoided, with the result that the extension arm is more secure and is particularly suitable for relatively great weights, i.e. for heavy devices, acting on the attachment piece.

Advantageous further developments of the extension arm described in the detailed description as set forth hereinbelow.

At least one securing screw is advantageously provided, which is screwed into the securing bush and on which the spring element is at least partially supported. Thus, the pre-tension force of the spring element can be adjusted and particularly additionally increased, the securing screw additionally being acted upon by a spring force from the spring element, so that the securing element is additionally prevented from being released unintentionally.

It is advantageous that the securing screw cooperates with the securing element to block a displacement of the securing bush relative to the securing element. This prevents the securing bush from being displaced with respect to the attachment piece in such a way that the securing element and/or further securing or attachment means, e.g. a cylinder pin, are not secured.

It is advantageous that the securing bush has a cutout in which the securing element and the spring element are partially arranged. Thus, the position of the securing element and/or the position of the spring element can be additionally fixed, so that in particular tilting of the securing element or the spring element in a plane perpendicular to the axis of the attachment piece is prevented.

The spring element is advantageously constructed from a preferably metal spring strip. It is advantageous here that the spring element has a first portion and a second portion which, in a relaxed condition of the spring element, are arranged at least substantially perpendicular to one another. This results in a spring element which is easy to manufacture and which generates a large spring force in the assembled condition of the extension arm.

It is furthermore advantageous that the first portion is longer than the second portion. Thus, the spring element can be advantageously guided in between the securing bush and the securing element and aligned between them. Advantageous alignment of the spring element in the cutout in the securing bush is particularly possible.

It is advantageous that the second portion is constructed to be such a length that it projects at least approximately over the lower edge of the securing bush in the assembled condition of the extension arm. Thus, when assembling the extension arm, it is particularly easy to determine whether the spring element is assembled correctly. This moreover enables the assembly personnel to carry out a simple check as to whether the spring element is installed in order to ensure the security of the extension arm. An essential factor here is that it is not necessary to carry out dismantling procedures in order to check whether the spring element is installed and whether it has been arranged correctly; instead this is possible merely by means of external examination.

The first portion and the second portion are advantageously connected by means of a U-shaped middle portion which abuts at least partially against the securing element.

Thus, the assembled position of the spring element is fixed in a direction parallel to the axis of the attachment piece, thus further simplifying assembly.

It is furthermore advantageous that at least one securing screw is provided, which is screwed into the securing bush and engages at least partially in the U-shaped middle portion of the spring element. Thus, the spring element is additionally secured, the securing bush moreover being secured against displacement in a direction along the axis of the attachment piece.

The inventive process as described herein is advantageous in that the securing element is pushed particularly deep into the groove in the connecting element in that the securing spring is pushed in between the securing bush and the securing element, the securing element additionally being acted upon by a holding force in that the securing spring is pre-tensioned by means of the securing bush as a result of displacing this latter along the attachment piece.

Advantageous further developments of the process are described in further detailed hereinbelow.

It is advantageous that a securing screw is furthermore screwed into the securing bush in order to block displacement of the securing bush and additionally tension the securing spring.

It is moreover advantageous that the connecting means connecting the connecting element to the attachment piece is inserted through an opening in the securing bush.

BRIEF DESCRIPTION OF THE DRAWING

Exemplary embodiments of the invention are illustrated in simplified manner in the drawing and explained in more detail in the description below. There is shown.

DETAILED DESCRIPTION OF THE PREFERRED EMBODIMENTS

Figure 1:
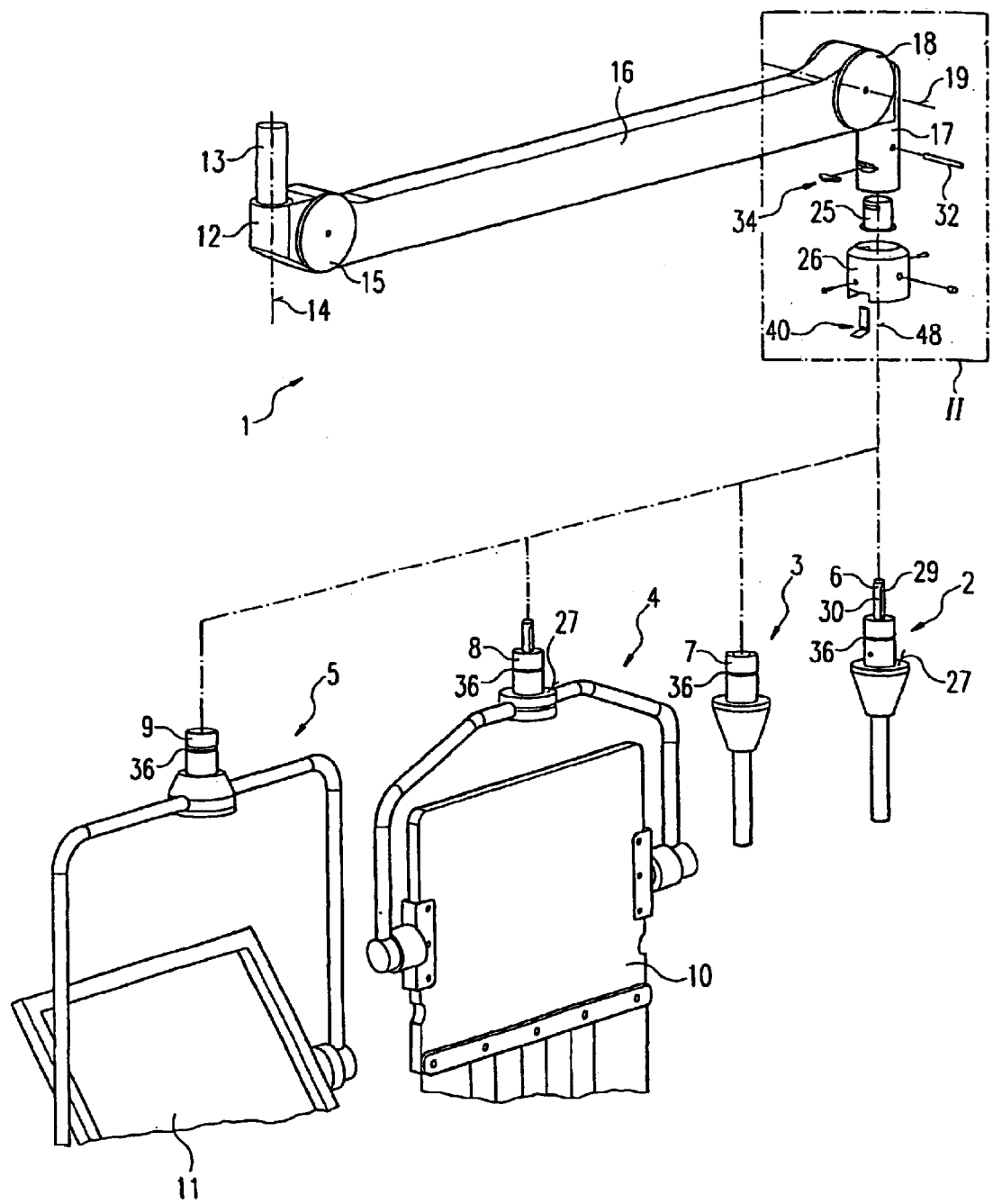
FIG. 1 an exemplary embodiment of an extension arm according to the invention, with a plurality of medical devices which can be connected to the extension arm, in a partially exploded illustration.

FIG. 1 shows an extension arm 1 for the suspended attachment of devices 2–5. For this, each of the devices 2–5 has a connecting element 6–9. The extension arm 1 and the connecting elements 6–9 are components of a supporting system which enables the preferably medical devices, e.g. a protective X-ray shield 10 and a display screen 11 to be exchangeably suspended in a room, the devices being suspended for example on a ceiling mount, e.g. in the form of a mounting rail, fixed to the ceiling.

The extension arm 1 has a connecting piece 12 which comprises a cylindrical pin 13, the extension arm 1 being pivotable about the axis of rotation 14. Moreover, the extension arm 1 has a horizontal arm 16, which is connected to the connecting piece 12 by means of the joint piece 15 and is pivotable or rotatable about the axis of rotation 14 of the pin 13 and inclinable with respect to a horizontal plane orientated perpendicularly to the axis of rotation 14. The extension arm 1 moreover has an attachment piece 17 which is connected by means of a joint piece 18 to the horizontal arm 16, so that the attachment piece 17 is pivotable about the axis 19 of the joint piece 18, relative to the horizontal arm 16.

The horizontal arm 16 can be constructed as a spring arm, as a result of which the weight of a device 2–5 is compensated and the device 2–5 remains in the predetermined position.

Figure 2:
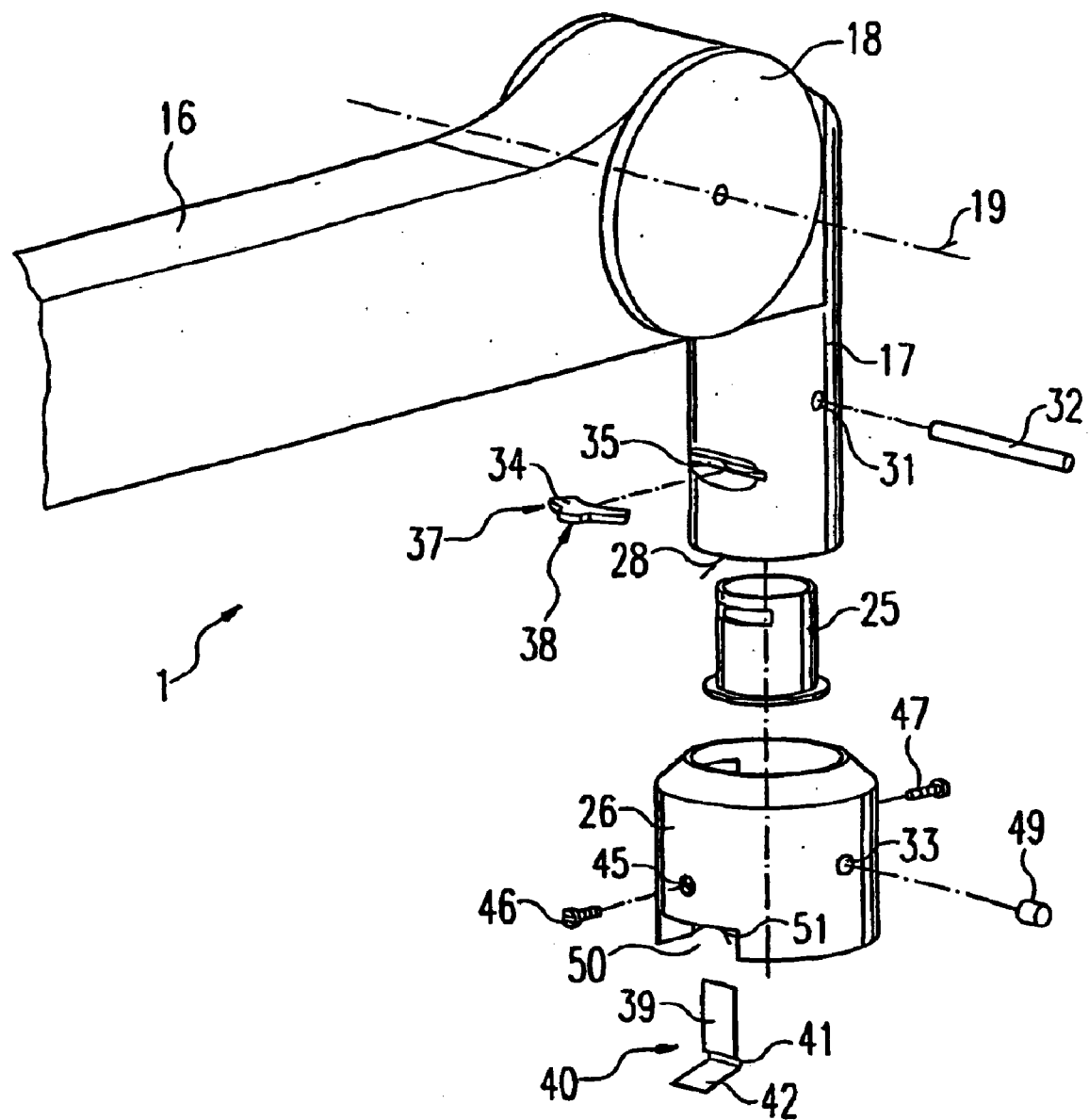
FIG. 2 the section denoted by II in FIG. 1.

The invention is described in more detail below, with reference to FIG. 2 which shows the section denoted by II in FIG. 1. Elements which have already been described are provided with corresponding reference numerals in all figures, thus making repeated description unnecessary.

For transporting the extension arm 1, the protective cap 25 is installed in the attachment piece 17 at the factory in order to deliver the extension arm 1 in a condition similar to that required for attaching a device 2–5, so that, as a result of the preparatory dismantling of the extension arm 1, it becomes clear to the assembly personnel how the extension arm 1 is to be initially assembled during connection to a device 2–5. It is thus possible to prevent assembly errors which may arise for example as a result of misunderstanding the assembly instructions.

The attachment of the device 6 or 8 to the extension arm 1 is described below. First of all, the securing bush 26 is pushed onto the attachment piece 17 and then the connecting element 6, 8 of the device 2, 4 is pushed into the attachment piece 17, the insertion depth being fixed by the stop 27 which abuts against the underside 28 of the attachment piece 17. Care should be taken here to arrange the elongated cutout 29 in the attachment pin 30 of the connecting element 6 opposite the cutout 31 in the attachment piece 17. In a suitable first position of the securing bush 26, the connecting means 32, which is constructed in this exemplary embodiment as a cylinder pin, can be inserted through the opening 33 in the securing bush 26 into the cutout 31, through the elongated cutout 29 in the connecting element 6, 8 and into a cutout in the attachment piece 17, which is opposite the cutout 31. Thus, the connecting element 6, 8 is connected to the attachment piece 17 by means of the connecting means 32, as a result of which the device 2, 4 is attached to the extension arm 1 in suspended manner.

To secure this attachment, the securing element 34 is inserted into a groove 36 in the connecting element 6, 8 through the opening 35 in the attachment piece 17 whilst the securing bush 26 is in a position close to the first position. The securing element 34 has a bent part 37 and a nose-shaped part 38. The bent part 37 is inserted at least partially into the groove 36, the radius of curvature of the bent part 37 of the securing element 34 being adapted to the inside radius of the peripheral groove 36. The first portion 39 of a spring element 40 is placed over the nose-shaped part 38 of the securing element 34, a stop for the spring element 40 against the nose 34 being produced by a U-shaped middle portion 41. After the spring element 40 has been pushed in, the securing bush 26 is displaced along the attachment piece 17 into a second position by way of the second portion 42 of the spring element 40, the securing spring 40 being pre-tensioned in that the second portion 42 is bent back.

In the second position of the securing bush 26, a securing screw 46 is screwed into the threaded bore 45 in the securing bush 26 so that, on the one hand, the spring element 40 is at least partially supported on the securing screw 46 and, on the other, displacement of the securing bush 26 relative to the securing element 34 or relative to the attachment piece 17 is blocked as a result of the securing screw 46 engaging in the U-shaped middle portion 41 of the spring element 40. A further securing screw 47 is furthermore provided, which is guided through a bore in the securing bush 26 and engages in a threaded bore in the attachment piece 17 in order to additionally secure the securing bush 26, particularly against twisting with respect to the axis 48 of the attachment piece 17. A plastic cap 49 is provided for closing the opening 33.

As an alternative to attaching the device 2 or 4 to the attachment piece 17 by means of the connecting means 32, in the case of the extension arm according to the invention it is also possible to provide other attachments which are secured accordingly.

For example, the devices 3 and 5 can be connected to the extension arm 1 in that a screw is screwed into the connecting element 7, 9 through an opening corresponding to the opening 33, it being preferable to provide a plurality of such screws. The securing bush 26 accordingly prevents the screw from being released, and the connecting means 32 is also prevented from becoming displaced. It is therefore clear that the attachment between the connecting element 6–9 and the attachment piece 17 can be secured according to the invention irrespective of the concrete design of the attachment.

The securing bush 26 has an approximately rectangular cutout 50, the spring 40 being guided in between the securing bush 26 and the attachment piece 17 in the region of the cutout 50. During assembly, it is thus easier to recognise where the spring 40 is to be assembled. Moreover, the cutout 50 defines a lower edge 51 of the securing bush 26. The second portion 42 of the spring element 40 is constructed to be such a length that it projects at least approximately over the lower edge 51 of the securing bush 26 in the assembled condition of the extension arm 1, as a result of which it is readily possible to detect from the outside whether the spring element 40 has been mounted correctly. Thus, as a result of the cutout 50 and the correct choice of length for the second portion 42 of the spring element 40, it is easily possible to check the securing action according to the invention.

Figure 3:
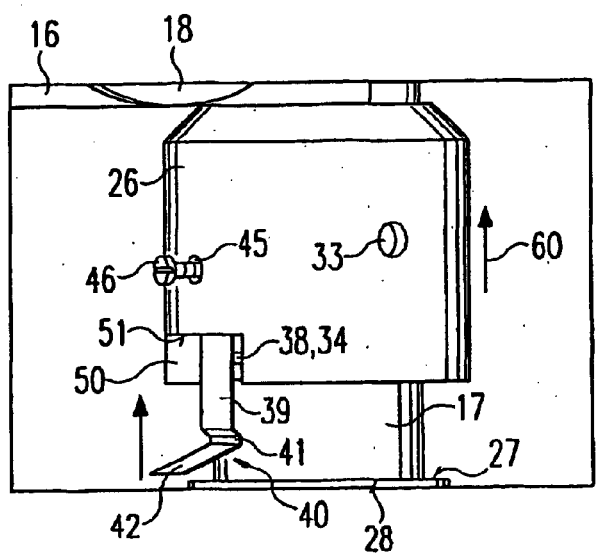
FIG. 3 a detail of the extension arm according to the invention during assembly of the spring element.

FIG. 3 shows a detail of the extension arm 1, in which the securing bush 26 is located in the first position.

Figure 4:
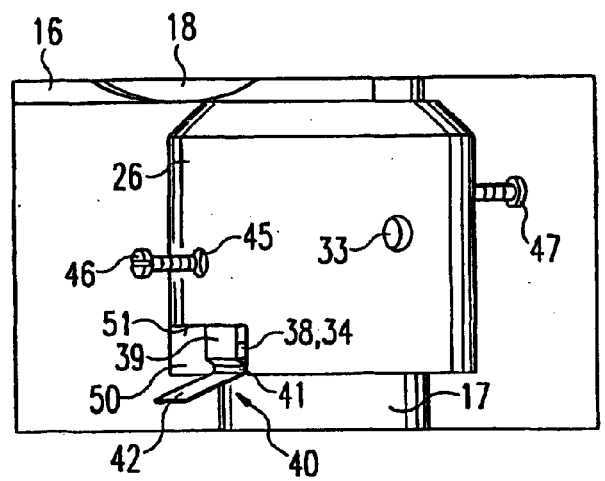
FIG. 4 a detail of the extension arm according to the invention after assembly of the spring element.

In order to mount the securing bush 26 in the first position on the attachment piece 17 of the extension arm 1, it has been moved along the attachment piece 17 in the direction 60 of the horizontal arm 16. In this position, the securing element 34 has been pushed through the opening 35 in the attachment piece 17 and into the groove 36 in the connecting element 6 through the cutout 50. The nose-shaped part 38 of the securing element 34 is partially visible in FIG. 3. When the securing screw 46 is removed, the spring element 40 is pushed over the nose-shaped part 38 of the securing element 34 in between the securing bush 26 and the attachment piece 17 until the U-shaped middle portion 41 abuts against the nose-shaped part 38 of the securing element 34, as shown in FIG. 4.

The second portion 42 of the spring element 40 is arranged substantially perpendicularly with respect to the first portion 39, so that the second portion 42 protrudes substantially perpendicularly from the attachment piece 17.

Figure 5:
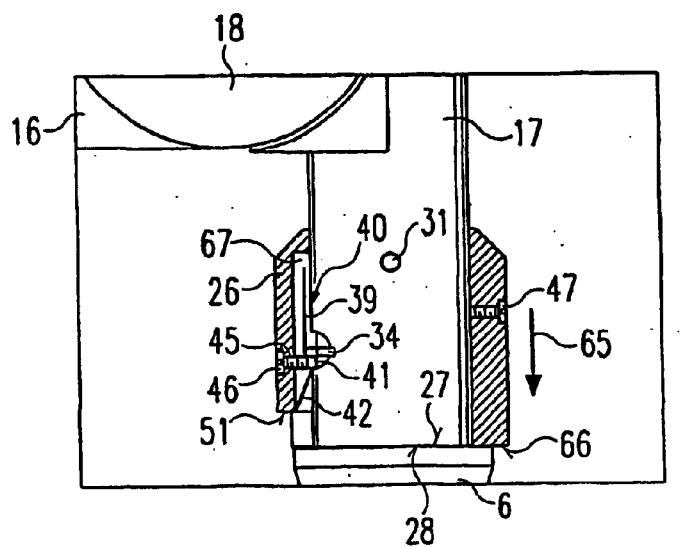
FIG. 5 a detail of the extension arm according to the invention in the assembled condition, in a partially sectional illustration.

As shown in FIG. 5, the securing bush 26 is then displaced along the attachment piece 17 in the direction 65, which is opposite to the direction 60, into a second position, the second portion 42 of the spring element 40 being bent to the attachment piece 17 as a result of the action of the lower edge 51 of the securing bush 26 in order to pretension the spring element 40. In the second position shown in FIG. 5, the threaded bore 45 is located on the side of the second portion 42 of the spring element 40, as seen from the securing element 34.

Therefore, in this position, the securing screw 46 engages in the threaded bore 45 in the U-shaped middle portion 41 of the spring element 40 when it is screwed in, thus blocking a displacement of the securing bush 26 along the attachment piece 17 in opposition to the direction 65. Since the securing bush 26 abuts at the lower edge 66 against the stop 27 of the connecting element 6, a displacement of the securing bush 26 along the attachment piece 17 in the direction 65 is moreover blocked. Thus, the displacement of the securing bush 26 along the attachment piece 17 is blocked in both directions and a release of the securing element 34 and, where applicable, the connecting means 32, is prevented under all circumstances.

In order to enable the securing element 34 and the spring element 40 to be received, the securing bush 26 has a cutout 67 whereof the width is somewhat greater than the width of the strip-shaped spring element 40, so that the spring element 40 is guided into the cutout 67 upon insertion. Thus, the position of the strip-shaped spring element 40 is produced by the cutout 67, and, in particular, lateral displacement of the spring element 40 is permanently reliably prevented.

The invention is not restricted to the exemplary embodiments described. In particular, the described securing means and the described securing process can be used for a plurality of different attachment options.

What is claimed is:

1. An extension arm (1), particularly a pivotable and inclinable extension arm for a supporting system, and for the suspension of an attachment, preferably medical devices (2–5), the extension arm comprising: means for attaching a connecting element (6–9) to an attachment piece (17), a securing element (34), which is guided through an opening (35) in the attachment piece (17), for securing the connecting element (6–9) on the attachment piece (17) by engaging a groove (36) in the connecting element (6–9), a securing bush (26), which surrounds the attachment piece (17) and the connecting element (6–9) at least partially, for securing the securing element (34), and a spring element (40), which is at least partially supported on the securing bush (26) to hold the securing element (34) in the groove (36) in the connecting element (6–9), the securing element is held by a pre-tension force, wherein the spring element (40) is pushed at least partially in between the securing bush (26) and the securing element (34), and at least one securing screw (46) is provided, which is screwed into the securing bush (26) and on which the spring element (40) is at least partially supported.

2. An extension arm according to claim 1, characterised in that the securing bush (26) has a cutout (67) in which the securing element (34) and the spring element (40) are partially arranged.

3. An extension arm according to claim 1, characterised in that the spring element (40) is constructed from a metal spring strip.

4. A process for assembling a preferred medical device (2–5) by securing connecting element (6–9) on an extension arm (1), particularly a pivotable and inclinable extension arm for a supporting system in a suspended attached position, the process comprising the steps of:

a) assembling a securing bush (26) on an attachment piece (17) of the extension arm (1) in a first position;

b) pushing the connecting element (6–9) into the attachment piece (17);

c) connecting the attachment piece (17) to the connecting element (6–9) by inserting a connecting means (32), particularly a cylinder pin;

d) inserting a securing element (34) into a groove (36) in the connecting element (6–9) through an opening (35) in the attachment piece (17);

e) pushing a spring element (40) at least partially in between the securing bush (26) and the securing element (34); and then f) displacing the securing bush (26) along the attachment piece (17) into a second position, the spring element (40) being pre-tensioned.

5. A process according to claim 4, further including the step of g) screwing a securing screw (46) into the securing bush (26) in order to block displacement of the securing bush (26) and additionally tensioning the spring element (40).

6. A process according to claim 4, further including that the connecting means (32) is inserted through an opening (33) in the securing bush (26).

7. An extension arm (1), particularly a pivotable and inclinable extension arm for a supporting system, and for the suspension of an attachment, preferably medical devices (2–5), the extension arm comprising: means for attaching a connecting element (6–9) to an attachment piece (17), a securing element (34), which is guided through an opening (35) in the attachment piece (17), for securing the connecting element (6–9) on the attachment piece (17) by engaging a groove (36) in the connecting element (6–9), a securing bush (26), which surrounds the attachment piece (17) and the connecting element (6–9) at least partially, for securing the securing element (34), and a spring element (40), which is at least partially supported on the securing bush (26) to hold the securing element (34) in the groove (36) in the connecting element (6–9), the securing element is held by a pre-tension force, the spring element (40) is pushed at least partially in between the securing bush (26) and the securing element (34), and wherein there is provided at least one securing screw (46) which cooperates with the securing element (34) to block a displacement of the securing bush (26) relative to the securing element (34).

8. An extension arm (1), particularly a pivotable and inclinable extension arm, for a supporting system, and for the suspension of an attachment, preferably medical devices (2–5), the extension arm comprising: means for attaching a connecting element (6–9) to an attachment piece (17), a securing element (34), which is guided through an opening (35) in the attachment piece (17), for securing the connecting element (6–9) on the attachment piece (17) by engaging a groove (36) in the connecting element (6–9), a securing bush (26), which surrounds the attachment piece (17) and the connecting element (6–9) at least partially, for securing the securing element (34), and a spring element (40), which is constructed from a metal spring dip, and which is at least partially supported on the securing bush (26) to hold the securing element (34) in the groove (36) in the connecting element (6–9), the securing element is held by a pre-tension force, and the spring element (40) is pushed at least partially in between the securing bush (26) and the securing element (34).

9. An extension arm according to claim 8, characterised in that at least one securing screw is provided (46), which is screwed into the securing bush (26) and on which the spring element (40) is at least partially supported.

10. An extension arm according to any one of claims 7 or 9, characterised in that said at least one securing screw (46) is screwed into the securing bush (26) and engages at least partially in a U-shaped middle portion (41) of the spring element (40).

11. An extension arm according to any one of claims 1, 7, or 8, characterized in that the spring element (40) has a first portion (39) and a second portion (42) which, in a relaxed condition of the spring element (40), are arranged at least substantially perpendicular to one another.

12. An extension arm according to claim 11, characterized in that the first portion (39) is longer than the second portion (42).

13. An extension arm according to claim 11, characterized in that the second portion (42) is constructed to be such a length that it projects at lest approximately over a lower edge (51) of the securing bush (26) in the assembled condition of the extension arm (1).

14. An extension arm according to claim 11, characterized in that the first portion (39) and the second portion (42) are connected by a U-shaped middle portion (41) which abuts at least partially against the securing element (34).

15. An extension arm according to claim 14, characterized in that at least one securing screw (46) is provided, which is screwed into the securing bush (26) and engages at least partially in the U-shaped middle portion (41) of the spring element (40).

* * * * *